(12) United States Patent
Landry et al.

(10) Patent No.: US 7,286,955 B1
(45) Date of Patent: Oct. 23, 2007

(54) SHIP PROXIMITY MEASUREMENT DISPLAY SYSTEM INCLUDING THE REMOTELY VIEWABLE BILLBOARD AND BRIDGE DISPLAY WITH DATA COMMUNICATION AND ATTACHMENT FRAMING

(75) Inventors: Benjamin Joel Landry, Atlanta, GA (US); James Francis Kelly, Dunwoody, GA (US)

(73) Assignee: Laser Atlanta, LLC, Norcross, GA (US)

( * ) Notice: Subject to any disclaimer, the term of this patent is extended or adjusted under 35 U.S.C. 154(b) by 240 days.

(21) Appl. No.: 11/384,717

(22) Filed: Nov. 1, 2004

(51) Int. Cl.
*G01B 5/00* (2006.01)

(52) U.S. Cl. .......... 702/158; 702/182; 342/41; 342/107; 342/455; 342/29; 701/301

(58) Field of Classification Search ........... 702/158, 702/182; 342/41, 29, 107, 455; 701/301
See application file for complete search history.

(56) References Cited

U.S. PATENT DOCUMENTS

| | | | |
|---|---|---|---|
| 4,942,533 A * | 7/1990 | Kakinami et al. | 701/225 |
| 5,617,199 A * | 4/1997 | Dunne | 356/5.01 |
| 6,055,418 A * | 4/2000 | Harris et al. | 455/91 |
| 6,226,061 B1 * | 5/2001 | Tagusa | 349/84 |
| 6,263,507 B1 * | 7/2001 | Ahmad et al. | 725/134 |
| 6,507,243 B2 * | 1/2003 | Harris et al. | 330/129 |
| 6,539,336 B1 * | 3/2003 | Vock et al. | 702/182 |
| 6,775,696 B1 * | 8/2004 | Hansen | 709/219 |
| 6,880,171 B1 * | 4/2005 | Ahmad et al. | 725/134 |
| 2002/0093639 A1 * | 7/2002 | Haga | 356/4.01 |
| 2002/0131405 A1 * | 9/2002 | Lin et al. | 370/352 |
| 2003/0014210 A1 * | 1/2003 | Vock et al. | 702/149 |
| 2003/0028269 A1 * | 2/2003 | Spriggs et al. | 700/83 |
| 2003/0225668 A1 * | 12/2003 | Goto et al. | 705/37 |
| 2003/0234724 A1 * | 12/2003 | Chiu | 340/464 |
| 2005/0038626 A1 * | 2/2005 | Flentov et al. | 702/141 |
| 2006/0031039 A1 * | 2/2006 | Flentov et al. | 702/141 |
| 2006/0173801 A1 * | 8/2006 | Music | 706/45 |
| 2006/0173858 A1 * | 8/2006 | Cantlin et al. | 707/10 |

* cited by examiner

*Primary Examiner*—Carol S. W. Tsai
(74) *Attorney, Agent, or Firm*—Ked & Associates, LLP

(57) ABSTRACT

This invention allows personnel located on two different structures, such as two ships, to continually monitor the separation distance between the two structures, with all of the necessary equipment being located on only one of the structures. This is accomplished using a laser range finder, or other range sensor, to continually measure separation distance and send it electronically to various displays. The displays are positioned and sized such that all involved personnel can view the continually updating separation distances. The invention incorporates displays large enough to be viewed ship-to-ship in direct sunlight, in addition to smaller displays. The displays are dimmable or backlit for night viewing and include a safety feature that turns them off when communication is lost with any range sensor. A strobe on the display helps personnel find where the display has been positioned, such as on a ships gunwale or hand railing.

20 Claims, 1 Drawing Sheet

SHIP PROXIMITY MEASUREMENT DISPLAY SYSTEM INCLUDING THE REMOTELY VIEWABLE BILLBOARD AND BRIDGE DISPLAY WITH DATA COMMUNICATION AND ATTACHMENT FRAMING

CROSS-REFERENCE TO RELATED APPLICATIONS

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATION-BY-REFERENCE OF MATERIALS SUBMITTED ON A COMPACT DISK

Not Applicable

FIELD OF THE INVENTION

The invention generally relates to monitoring and acting on the closing separation distance between two structures. This generally relates to re-supplying ships at sea or performing an underway replenishment (UNREP). One ship needs to approach another ship and then maintain station keeping with that ship. Or a ship needs to approach some structure such as a mooring to park along side.

BACKGROUND OF THE INVENTION

The most common example of the need to monitor and act on the separation distances between one structure and another structure, is when one ship is being approached by another ship and then performing station keeping with that ship in order to transfer supplies between the two ships while at sea. This is referred to by the Navy as an UNREP or underway replenishment.

The current state of the art is for the two ships to approach each other using only a "feel" for the distance between the two ships. One it is thought that the two ships are close enough, a line is passed between them. The ships then back off from each other to the desired station keeping distance. The line has flags on it at regular intervals. Station keeping is performed by noting the number of flags hanging on the line between the two ships as the way of monitoring the separation distance between the two ships. This time-tested method is still the primary station keeping separation distance measuring tool in use today. It requires at least one person to manually haul on the flag rope and injuries have occurred. In addition the separation distance can only be estimated while approaching close enough to pass the flag line between the ships. The potential hazards of approaching too close to avoid contact is real. This invention will inform all parties involved of the current distance between the two ships both during the critical approach and the long station keeping phases to ensure that a safe distance is maintained between the two vessels at all times.

BRIEF SUMMARY OF THE INVENTION

This invention eliminates the guesswork associated with guiding ships or other structures towards other structures such as ships, wharfs, jetties, docks, piers, bridges and mooring points. It measure and displays the separation distance in real time on numerous displays located as needed about one of the structures so that everyone that need to know the separation distance can view that information from their current location without having to carry around any equipment. It is also economical, as only one of the structures needs to be equipped with the invention. Hence only the supply ship at sea, rather than every ship that will be supplied, requires the invention, to take advantage of the safety that eliminating the separation distance guesswork provides. During re-supply station-keeping operations, this invention eliminates the hazard of one person pulling of the separation rope as described in the background art section.

DETAILED DESCRIPTION OF THE INVENTION

Figure 1:
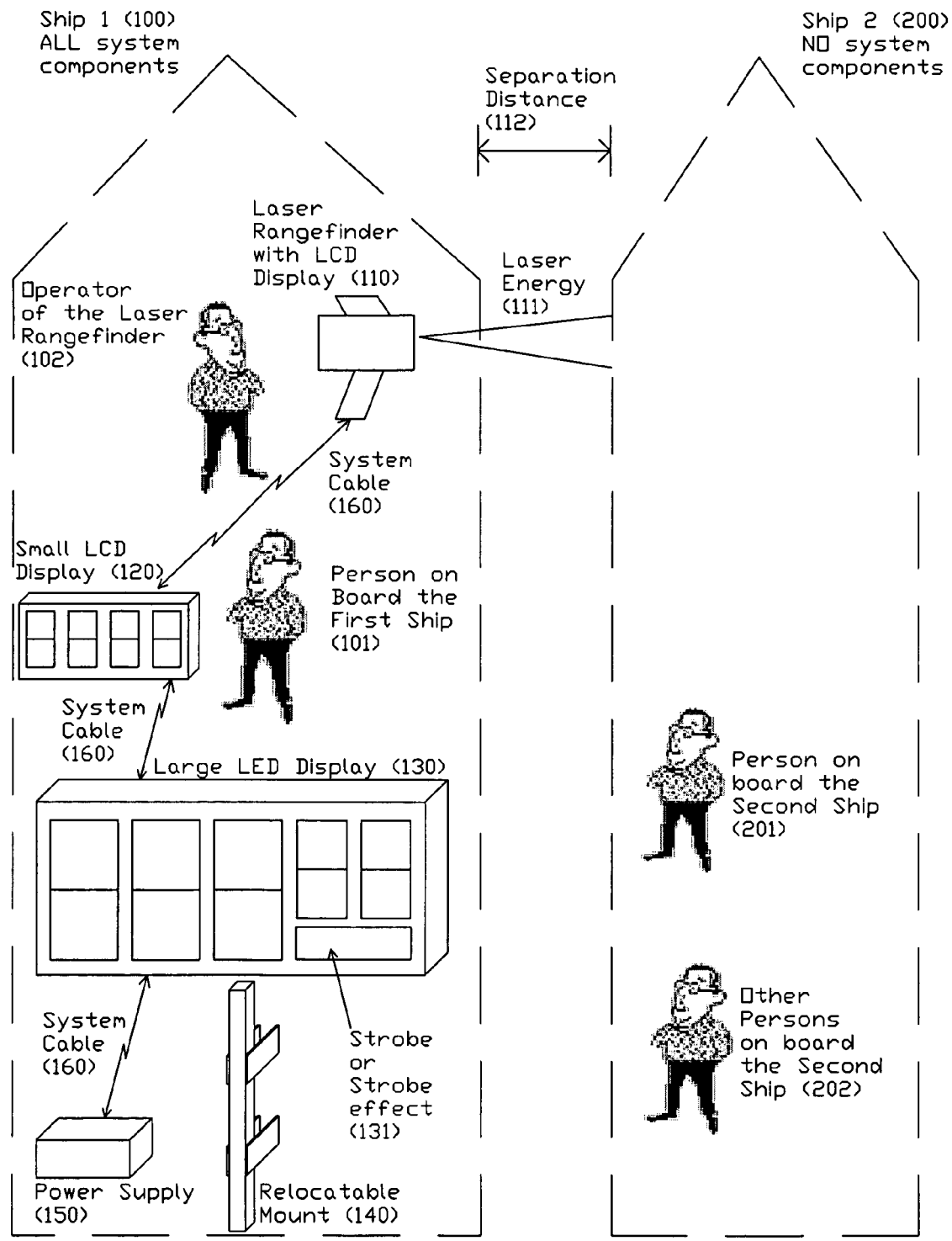
FIG. 1 shows a typical use of the invention where one ships is approaching another ship and how all of the components of the invention are on only one of the ships.

The components of the invention are the Laser Rangefinder 110, the Small LCD Display 120, the Large LED Display 130, the Re-locatable Mount 140, the System Power Supply 150 and a set of System Cables 160. The System Cables 160 supply power from the Power Supply 150 to all system components and provide the data communication from the Laser Rangefinder 110 to all system components. The System Cables 160 come in various lengths, have the same connector at both ends, and so can be used interchangeably to connected the various system components together in a daisy chain fashion. The display components 120 and 130 have two identical connectors to support connecting all system components in this daisy chain fashion.

The invention allows multiples of the Small LCD Display 120 and multiple of the Large LED Displays 130 to be connected to the Laser Rangefinder 110 at the same time. The various display components 120 and 130 are then positioned around the First Ship 100 to allow viewing of the Separation Distance 112 by Persons on Board the First Ship 101 and by Person on Board the Second Ship 201. The exact size of the LCD module used to construct the Small LCD Displays 120 can be adjusted to match the anticipated short viewing distance. The exact size of the LED boards used to construct the Large LED Display 130 can be adjusted to match the anticipated long viewing distance. The invention also allows a separate power supplies to be used on any system component and for the communication with that component to be done wirelessly.

While the Small LCD Display 120 can be set down most anywhere, the invention includes a Re-locatable Mount 140 to allow the Large LED Display 130 to be positioned in various locations around the structure or ship including the gunwales and hand railings of a ship. Since the Large LED Display 140 can be in various locations on the First Ship 100 and Persons On Board the Second Ship 201 may not know where the Large LED Display 140 is located, the Operator of the Laser Rangefinder 102 can activate a Strobe or Strobe effect 131 on the Large LED Display 140 to aid persons in locating the position of the Large LED Display 140. The Operator of the Laser Rangefinder 102 can also select from various units of measure to be used on the display including feet, meters and yards. The Small LCD Display 120 and the Large LED Display 140 will also show the units of measure for the Separation Distance 112.

In operation the Second Ship 200 will approach the First Ship 100 and begin station keeping as part of an underway replenishment operation. The Operator of the Laser Rangefinder 102 aims the Laser Rangefinder 110 at the approaching Second Ship 200. The eye safe Laser Energy 111 from the Laser Rangefinder 110 determines the Separation Distance 112 between the two ships. This Separation Distance 112 is sent via the System Cables 160 to all Small LCD Displays 120 on board the First Ship 100 and all Large LED Displays 130 on board the First Ship 100. No equipment is required on the Second Ship 200 as the persons on the Second Ship 200 can read the Large LED Display 130 at ship-to-ship distances. Other Persons on board the Second Ship 202 on board the second ship can view the Separation Distance 112 displayed on one or more Large LED Displays 130. The same Separation Distance 112 is displayed on all displays. If communication over the System Cables 160 is lost, each Small LCD Display 120 and each Large LED Display will turn off the displayed Separation Distance 112 to prevent actions being taken on stale information.

What we claim as our invention is:

1. A system for monitoring and displaying a separation distance between a first structure and a second structure, comprising:
   a rangefinder mounted on the first structure, wherein the rangefinder determines a separation distance between the first structure and the second structure; and
   a display coupled to the rangefinder and mounted on the first structure, wherein the display displays the separation determined by the rangefinder, and wherein the display is readily viewable by a person located on the second structure.

2. The system of claim 1, wherein the rangefinder is a laser rangefinder.

3. The system of claim 1, wherein the display comprises a first display, and further comprising a second display coupled to the rangefinder and mounted on the first structure, wherein the second display is readily viewable by a person located on the first structure.

4. The system of claim 3, wherein the first display is a large display such that the display is readily viewable by a person located on the second structure when the separation distance is large.

5. The system of claim 4, wherein the second display is smaller than the first display.

6. The system of claim 1, further comprising a strobe located adjacent the display.

7. The system of claim 6, wherein the strobe is a portion of the display.

8. The system of claim 1, wherein the display will go blank if a connection between the rangefinder and the display is lost.

9. The system of claim 1, wherein a user can select the type of distance units displayed on the display.

10. The system of claim 1, wherein the display is wirelessly coupled to the range finder.

11. A system for monitoring and displaying a separation distance between a moving first structure and a moving second structure, comprising:
    a rangefinder mounted on the first structure, wherein the rangefinder determines a separation distance between the first structure and the second structure; and
    a display coupled to the rangefinder and mounted on the first structure, wherein the display displays the separation determined by the rangefinder, and wherein the display is readily viewable by a person located on the second structure.

12. The system of claim 11, wherein the rangefinder is a laser rangefinder.

13. The system of claim 11, wherein the display comprises a first display, and further comprising a second display that is mounted on the first structure and that is coupled to the rangefinder, wherein the second display displays the separation distance determined by the range finder, and wherein the second display is readily viewable by a person on the first structure.

14. The system of claim 13, wherein the first display comprises a large display such that a person on the second structure can readily read the first display even when the separation distance is large, and wherein the second display is smaller than the first display.

15. The system of claim 11, wherein the display comprises a first display that is relatively large such that the first display is readily viewable by a person located on the second structure when the separation distance is large, and further comprising a plurality of second smaller displays that are also coupled to the rangefinder, wherein the second smaller displays are mounted on the first structure and also display the separation distance.

16. The system of claim 11, further comprising a strobe located adjacent the display, wherein the strobe allows a person on the second structure to quickly locate the display.

17. The system of claim 11, wherein the display will go blank if a connection between the rangefinder and the display is lost.

18. The system of claim 11, wherein a user can select the type of distance units displayed on the display.

19. The system of claim 11, wherein the display is wirelessly coupled to the range finder.

20. The system of claim 11, further comprising a relocatable mount for the display, wherein the mount can position the display at multiple locations on the first structure.

* * * * *